UNITED STATES PATENT OFFICE.

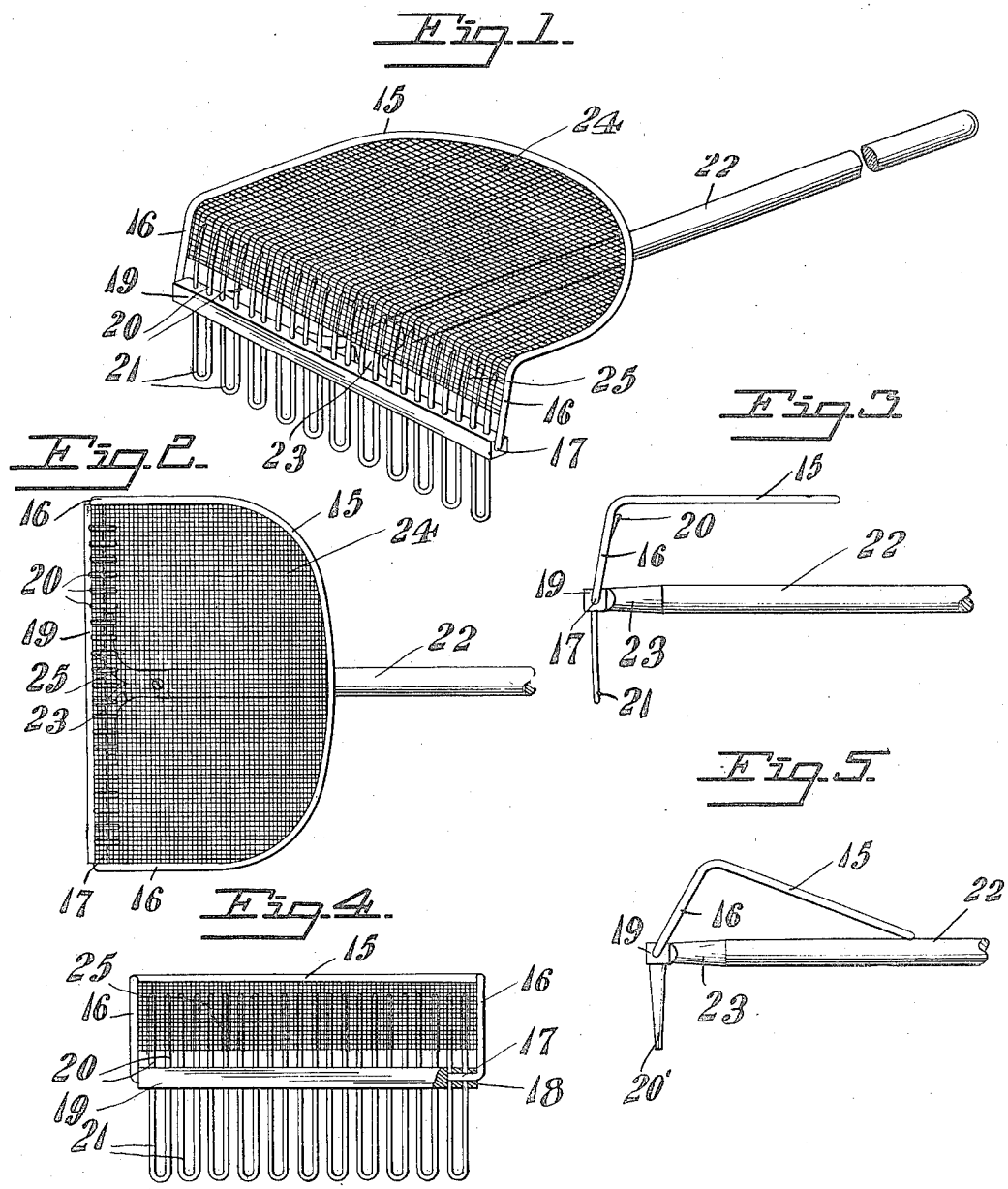

LUDWIG MEULER, OF OCONOMOWOC, WISCONSIN.

RAKE.

1,227,478.

Specification of Letters Patent.

Patented May 22, 1917.

Application filed November 23, 1915. Serial No. 63,085.

*To all whom it may concern:*

Be it known that I, LUDWIG MEULER, a citizen of the United States, residing at Oconomowoc, in the county of Waukesha and State of Wisconsin, have invented new and useful Improvements in Rakes, of which the following is a specification.

This invention relates to lawn and garden rakes, and it has for its object to produce an improved attachment for such rakes whereby the material that is raked together will be bunched in heaps instead of falling over the top of the rake, as is oftentimes the case.

A further object of the invention is to produce a simple and improved bunching attachment which may be readily applied to and used in connection with a rake of ordinary construction.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a perspective view showing the improved bunching attachment applied to a double toothed lawn rake.

Fig. 2 is a top plan view showing the rake head to which the attachment has been applied.

Fig. 3 is a side view of the same.

Fig. 4 is a front view.

Fig. 5 is a side elevation showing a single toothed rake to which the invention has been applied.

Corresponding parts in the several figures are denoted by like characters of reference.

The frame of the improved attachment consists of a yoke or arch 15 formed by suitably bending a rod of wire of proper dimensions, the limbs of said yoke being further bent to produce downwardly extending arms 16 having terminal spindles 17 that extend laterally in an inward direction, said spindles being in axial alinement with each other for the purpose of engaging bearings which may consist of sockets or recesses 18 which are provided for the reception of said spindles in the ends of a rake head 19 of ordinary construction. In Figs. 2, 3 and 4 a rake head has been shown which is provided with double teeth which are formed by bending pieces of wire midway of their respective lengths to produce loops, the limbs of said loops being passed through the rake head to produce single teeth 20 on one side of the rake head and double or looped teeth 21 on the other side thereof. The rake head is provided with a handle 22, said handle being also connected with the rake head by the customary braces 23. The yoke or frame 15 is covered with light material, such as wire fabric, to produce a wall 24, said wall being extended to form substantially at a right angle thereto a flange 25 which is connected with the arms 16. It will be observed that the free end of the improved attachment extends above the handle 22 of the rake, the downward movement thereof being limited by the rake handle while there is no obstruction to the upward swinging movement of the attachment, thereby enabling a large quantity of material to be gathered or bunched by the rake beneath the said attachment.

In operation, the improved attachment is applied to the rake by engaging the spindles 17 with the bearings at the ends of the rake head. When the rake head is provided with double teeth, as in Figs. 2, 3 and 4, the flange portion 25 of the wall 24 will be supported on the upstanding or upwardly projecting teeth 20 or 21, as the case may be, according to which of the teeth are turned downward for present use. The wall portion 24 will thus be supported in an approximately parallel relation to the rake handle, as will be clearly seen in Fig. 3. When the rake is used for the purpose of gathering cut grass, dead leaves or the like, the material will become bunched below the wall portion 24 and behind the flange 25, thus permitting a large heap to be accumulated without the material falling over the top of the rake head.

When the device is applied to a rake having only a single set of teeth 20', as seen in Fig. 5, the arch portion of the frame may be permitted to rest on the handle, thereby supporting the wall portion 24 in a slightly inclined position, said wall portion, together with the flange 25, serving to confine the material which is being gathered by the rake until it shall be desired to discharge the same. It will also be seen that the attachment is free to swing in an upward direction about the axis of the spindles 17, thus enabling a large load to be accumulated before discharging the same.

The improved attachment, as will be seen, is simple in construction, capable of being manufactured at a small expense and capable of being easily applied to an ordinary lawn or garden rake by simply providing the head thereof with bearings for the reception of the spindles 17.

Having thus described the invention, what is claimed as new, is:—

1. The combination with a rake having a handle of a swingingly supported bunching attachment having its free end extended above and adapted to be supported on the handle.

2. The combination with a rake of a bunching attachment pivotally connected with the rake head and extending above the handle of the rake so as to yield to the upward pressure of material that is being gathered.

3. The combination with a rake of a bunching attachment pivotally connected with the rake head, said attachment comprising a frame and material stretched thereon for gravitational engagement with material gathered by the rake.

4. The combination with a rake, the head of which is provided with sockets in the ends thereof, of a bunching attachment comprising a rod bent to form a yoke having limbs provided with downwardly extending arms, said arms having laterally extending spindles for engagement with the sockets in the rake head, and cover material mounted on said yoke and arms to present a wall having a downwardly extending flange.

5. The combination with a rake head having sockets in the ends thereof of a swingingly supported bunching attachment consisting of a frame having arms provided with spindles pivotally engaging the bearings, the frame being covered with material to present an obstructing wall, said wall having a flange at substantially right angles thereto.

In testimony whereof I affix my signature in presence of two witnesses.

LUDWIG MEULER.

Witnesses:
ANTHONY G. DERSE,
MARY BECKLEY.